Figure 1:
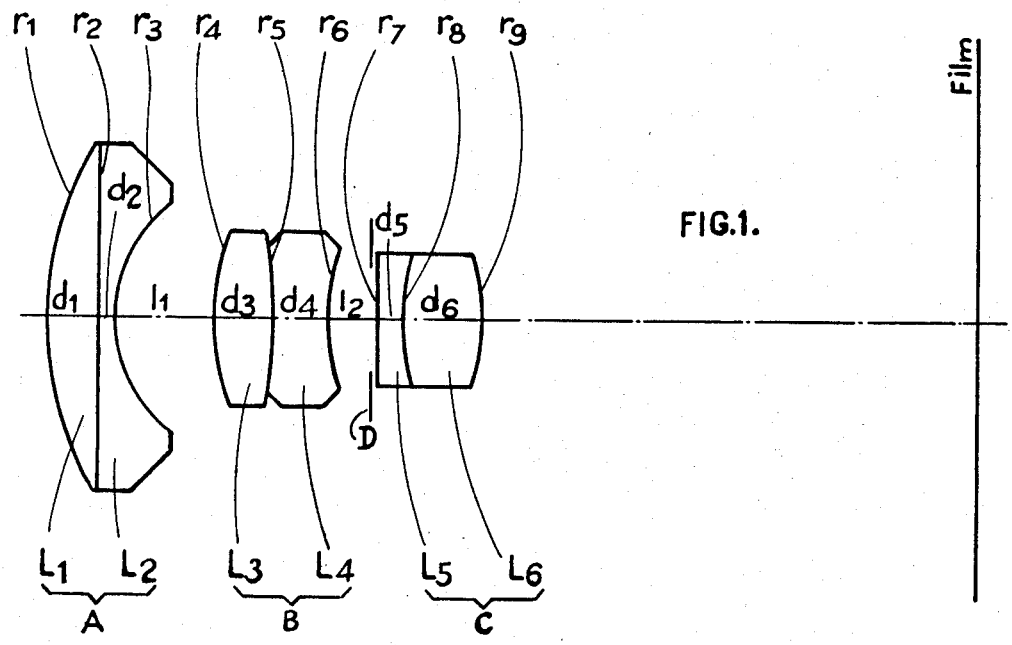

Dec. 4, 1956     L. J. BERTELE     2,772,601
WIDE ANGLE PHOTOGRAPHIC OBJECTIVE COMPRISING
THREE AIR SPACED COMPONENTS
Filed June 13, 1955

Inventor:
Ludwig Jakob Bertele
By his attorneys:
Baldwin & Wight

2,772,601
Patented Dec. 4, 1956

2,772,601
WIDE ANGLE PHOTOGRAPHIC OBJECTIVE COMPRISING THREE AIR SPACED COMPONENTS

Ludwig Jakob Bertele, St. Gall, Switzerland

Application June 13, 1955, Serial No. 515,151

Claims priority, application Switzerland June 18, 1954

8 Claims. (Cl. 88—57)

The invention relates to a wide-angle objective and is directed to the problem of increasing the back focus, that is the distance between the image plane and the rear lens surface. Such objectives are required for example for single lens reflex cameras, in which space must be provided for the swinging mirror, or for cameras with built-in sector shutters. The increase of back focus is usually attained by fitting a diverging meniscus convex towards the object at a certain distance in front of a converging lens group. The latter consists, so far as has been proposed up to the present, of three or four components separated by air.

Investigations have, however, shown that by the use of the present invention it is possible to construct such an objective providing a good image with only two converging components. The objective according to the invention comprises only three components separated by air, the first component being a diverging meniscus convex towards the object and the second and third components having converging power and being separated by an air space to accommodate the diaphragm and having the form of a converging lens, the third component having its more strongly curved outer surface convex towards the image.

The objective is described as for photography of the usual kind, in which the object is in front of the camera and occupies the position of the more distant conjugate plane, the film being placed at the nearer conjugate plane. The components are reckoned from the front or object side towards the film at the rear. If the objective is used for projection, the passage of light will, of course, be in the reverse direction.

The two outer surfaces of the converging components away from the diaphragm are convex and have a distance between them which in the preferred form is greater than $0.25\,f$ and less than $1.40\,f$, where $f$ is the focal length of the complete objective. For smaller apertures values towards the lower limit should be adopted and for larger apertures those towards the upper limit.

For the purpose of keeping distortion within narrow limits the diverging component is preferably made up of a converging lens of high refractive index and a diverging lens of low refractive index. Advantageously the difference between the refractive indices for the $d$-line is at least 0.060.

The second component is advantageously made up of at least two lenses, namely a converging lens facing the first component with high refractive index and a diverging lens with lower refractive index. This measure also promotes correction of distortion, especially if the said lenses are cemented together.

In order to have equal image sizes for different parts of the spectrum, the third component is made up of at least two lenses cemented together, namely a diverging lens with higher dispersion and a converging lens with less dispersion. If, in this case, the individual lenses are so shaped that a cemented surface convex towards the object ensues with a lower refractive index on the convex side thereof than on the concave side, this has a favourable influence on the correction of coma.

Since great glass surfaces in contact with air may be made to a great extent free from reflection by treatment, the cementing of the lens surfaces may be completely or partly dispensed with in so far as no total internal reflection of the image-forming rays is likely to occur, as in the third or rear component. In such a case within the individual lens components there may be thin air layers with slight differences of curvature at the adjacent surfaces. A lens component subdivided in this way is to be regarded in the sense of the invention as a single component. An air layer introduced into a component on any grounds with plane or curved boundary surfaces falls into this manner of consideration.

Figure 2:
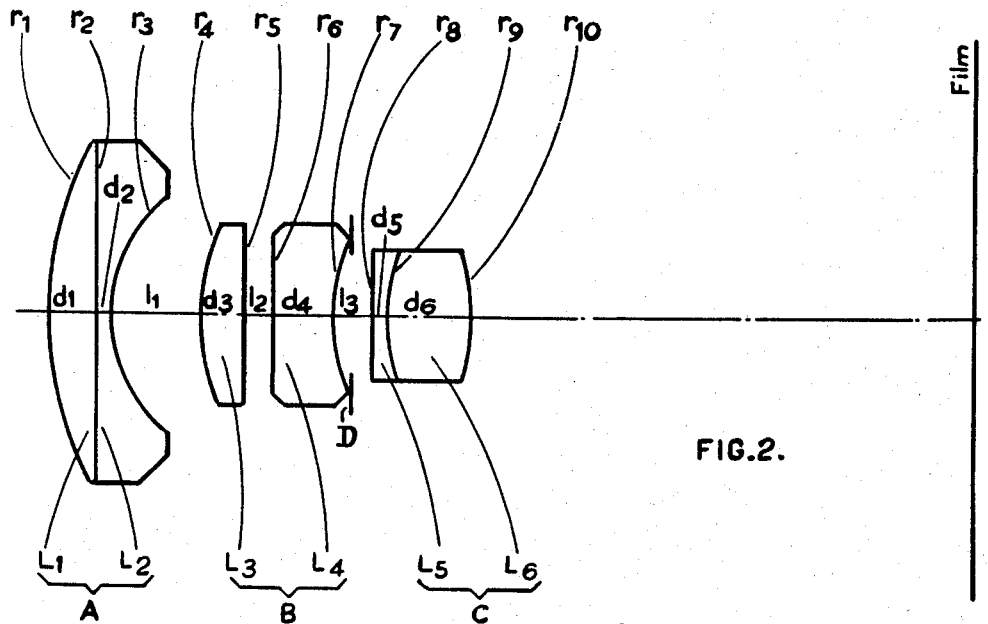

The accompanying drawing shows in the usual conventional form objectives in accordance with the invention. Three examples are given by means of the tables of data. In the drawing Figure 1 shows the first two examples, in which the differences in dimensions are not sufficient to be evident in the figure, and Figure 2 shows the third example, which has a thin air space introduced into the second component.

All the examples have an angle of field of about 63° and a relative aperture of $f/3.5$ with a focal length of 100. The three components are marked A, B and C. Component A is a meniscus of diverging power convex towards the object. Component B is a meniscus with converging power convex towards the front component A. Component C is also of converging power. The air space between components B and C provides space for a diaphragm D.

In Example 1 (Figure 1) the distance between the two convex surfaces of the components B and C away from the diaphragm is $0.533\,f$. Component A is made up of a converging lens $L_1$ and diverging lens $L_2$ The refractive index of lens $L_1$ is 0.1708 greater than that of lens $L_2$. Component B is made up of a converging lens $L_3$ which is 0.1296 greater than that of lens $L_4$. Component C is made up of a diverging lens $L_5$ of higher dispersion and a converging lens $L_6$ of lower dispersion cemented together.

In Example 2 (Figure 2) the axial separation between the two convex surfaces of components B and C away from the diaphragm is $0.54\,f$. Component A consists of a converging lens $L_1$ and a diverging lens $L_2$, the refractive index of lens $L_1$ being 0.2156 greater than that of lens $L_2$. Component B is made up of a converging lens $L_3$ and a diverging lens $L_4$. The refractive index of lens $L_3$ is 0.1275 greater than that of lens $L_4$. The component C is made up of a diverging lens $L_5$ and a converging lens $L_6$, the individual lenses being of such shapes that a cemented surface $r_8$ convex towards the diaphragm is formed with a refractive index on the convex side 0.0675 less than that on the concave side.

In Example 3 (Figure 2) the axial separation of the two convex surfaces of components B and C away from the diaphragm is $0.5384\,f$. Component A is made up of a converging lens $L_1$ and a diverging lens $L_2$, the refractive index of the former being 0.21413 greater than that of the latter. Component B is made up of a converging lens $L_3$ and a diverging lens $L_4$, the refractive index of the former being 0.10315 greater than that of the latter. In this case the two lenses are separated by a thin air space having slight but differing curvatures of its boundary surfaces. This air space is substantially less than the space $h$ between components A and B. The component C consists of a diverging lens $L_5$ and a converging lens $L_6$, the two having between them a cemented surface $r_9$ convex towards the diaphragm with a refractive index on the convex side 0.06768 less than that on the convex side. The diaphragm should be placed at 2.91 mm. from the surface $r_7$ measured on the axis.

The following are the optical data of the objectives shown:

L denotes the lenses
r the radii
d the lens thicknesses
l the air spaces
n the refractive indices
v the Abbé numbers

Example 1

[Focal length 100 mm.    Back focus 98.5 mm.]

| Lenses | Radii | Thicknesses and Separations | Kinds of glass | |
|---|---|---|---|---|
| | | | n | v |
| $L_1$ | $r_1=+\ 68.45$ | $d_1=\ 9.9$ | 1.6583 | 57.3 |
| | $r_2=\infty$ | | | |
| $L_2$ | | $d_2=\ 3.0$ | 1.4875 | 70.0 |
| | $r_3=+\ 27.34$ | | | |
| | | $l_1=19.8$ | | |
| | $r_4=+\ 44.94$ | | | |
| $L_3$ | | $d_3=11.9$ | 1.6910 | 54.8 |
| | $r_5=-\ 99.21$ | | | |
| $L_4$ | | $d_4=10.9$ | 1.5614 | 45.3 |
| | $r_6=+\ 39.33$ | | | |
| | | $l_2=\ 9.9$ | | |
| | $r_7=-476.21$ | | | |
| $L_5$ | | $d_5=\ 5.0$ | 1.6545 | 33.8 |
| | $r_8=+\ 44.91$ | | | |
| $L_6$ | | $d_6=15.6$ | 1.6583 | 57.3 |
| | $r_9=-\ 47.78$ | | | |

Example 2

[Focal length 100 mm.    Back focus 9.1 mm.]

| Lenses | Radii | Thicknesses and Separations | Kinds of glass | |
|---|---|---|---|---|
| | | | n | v |
| $L_1$ | $r_1=+\ 73.79$ | $d_1=\ 9.0$ | 1.7170 | 48.0 |
| | $r_2=+583.30$ | | | |
| $L_2$ | | $d_2=\ 2.50$ | 1.50137 | 56.6 |
| | $r_3=+\ 28.97$ | | | |
| | | $l_1=18.36$ | | |
| | $r_4=+\ 49.50$ | | | |
| $L_3$ | | $d_3=10.0$ | 1.72019 | 50.2 |
| | $r_5=\infty$ | | | |
| $L_4$ | | $d_4=21.40$ | 1.59270 | 35.4 |
| | $r_6=+\ 41.20$ | | | |
| | | $l_2=\ 8.0$ | | |
| | $r_7=-490.0$ | | | |
| $L_5$ | | $d_5=\ 2.50$ | 1.57501 | 41.3 |
| | $r_8=+\ 37.0$ | | | |
| $L_6$ | | $d_6=12.10$ | 1.64250 | 58.1 |
| | $r_9=-\ 45.55$ | | | |

Example 3

[Focal length 100 mm.    Back focus 97.93 mm.]

| Lenses | Radii | Thicknesses and Separations | Kinds of glass | |
|---|---|---|---|---|
| | | | n | v |
| $L_1$ | $r_1=+\ 73.81$ | $d_1=\ 9.89$ | 1.71562 | 48.3 |
| | $r_2=+591.1$ | | | |
| $L_2$ | | $d_2=\ 2.40$ | 1.50149 | 56.6 |
| | $r_3=+\ 28.74$ | | | |
| | | $l_1=18.16$ | | |
| | $r_4=+\ 48.95$ | | | |
| $L_3$ | | $d_3=\ 9.04$ | 1.71968 | 50.2 |
| | $r_5=-395.63$ | | | |
| | | $l_2=\ 5.65$ | | |
| | $r_6=-370.97$ | | | |
| $L_4$ | | $d_4=11.47$ | 1.61653 | 36.6 |
| | $r_7=+\ 39.26$ | | | |
| | | $l_3=\ 7.91$ | | |
| | $r_8=-593.19$ | | | |
| $L_5$ | | $d_5=\ 2.40$ | 1.57542 | 41.3 |
| | $r_9=+\ 36.41$ | | | |
| $L_6$ | | $d_6=17.37$ | 1.64310 | 57.7 |
| | $r_{10}=-\ 44.39$ | | | |

What is claimed is:

1. A wide-angle objective consisting of three components, separated by air spaces, namely a first component reckoned from the object side of diverging power and meniscus form convex towards the object and having a focal length within the range of $-0.95\ f$ to $-3.00\ f$, where $f$ is the focal length of the complete objective, the said component comprising at least a converging lens and a diverging lens having the lens curved surfaces of each facing towards each other, a second component of converging power and comprising at least a converging lens and a diverging lens, and a third component also of converging power and having its more curved outer surface towards the image and convex thereto, the said third component having a cemented surface concave towards the image, the refractive index being higher on the image side thereof than on the object side, in which the air-space reckoned on the axis between the first and second components is within the range of $0.06\ f$ to $0.40\ f$, the air-space between the second and third components has the form of a converging lens and is adapted to receive a diaphragm, and the axial separation between the outer surfaces of the second and third components remote from the diaphragm space lies within the range of $0.25\ f$ and $1.4\ f$.

2. An objective is defined in claim 1, in which the converging lens and the diverging lens of the first component are cemented together with the converging lens towards the object and the converging lens having a higher refractive index than the diverging lens.

3. An objective as defined in claim 1, in which the converging lens and the diverging lens of the second component are cemented together, the converging lens having a higher refractive index than the diverging lens.

4. An objective as defined in claim 1, in which the converging lens and the diverging lens of the second component are separated by an air-space reckoned on the axis less than that between the first and second components, and in which the difference between the reciprocals of the radii of curvature of the surfaces bounding the said air-space in the second component is not greater than $$\frac{0.5}{f}$$

5. An objective as defined in claim 1, in which the air-space reckoned on the axis between the first and second components is greater than that between the second and third.

6. A wide-angle objective having substantially the following optical data in relation to a focal length of 100, where L represents the lenses, r the radii, d the axial thicknesses, l the air spaces measured on the axis, n the refractive index of the glass for the d-line, and v and Abbé dispersion number, the suffixes denoting the numerical order from the object side:

| Lenses | Radii | Thicknesses and Separations | n | v |
|---|---|---|---|---|
| $L_1$ | $r_1=+\ 68.45$ | $d_1=\ 9.9$ | 1.6583 | 57.3 |
| | $r_2=\infty$ | | | |
| $L_2$ | | $d_2=\ 3.0$ | 1.4875 | 70.0 |
| | $r_3=+\ 27.34$ | | | |
| | | $l_1=19.8$ | | |
| | $r_4=+\ 44.94$ | | | |
| $L_3$ | | $d_3=11.9$ | 1.6910 | 54.8 |
| | $r_5=-\ 99.21$ | | | |
| $L_4$ | | $d_4=10.9$ | 1.5614 | 45.3 |
| | $r_6=+\ 39.33$ | | | |
| | | $l_2=\ 9.9$ | | |
| | $r_7=-476.21$ | | | |
| $L_5$ | | $d_5=\ 5.0$ | 1.6545 | 33.8 |
| | $r_8=+\ 44.91$ | | | |
| $L_6$ | | $d_6=15.6$ | 1.6583 | 57.3 |
| | $r_9=-\ 47.78$ | | | |

7. A wide-angle objective having substantially the following optical data in relation to a focal length of 100, where L represents the lenses, $r$ the radii, $d$ the axial thicknesses, $l$ the air spaces measured on the axis, $n$ the refractive index of the glass for the $d$-line, and $v$ the Abbé dispersion number, the suffixes denoting the numerical order from the object side:

|  |  |  | $n$ | $v$ |
|---|---|---|---|---|
| $L_1$ | $r_1=+73.79$ | $d_1=9.0$ | 1.7170 | 48.0 |
|  | $r_2=+583.30$ |  |  |  |
| $L_2$ |  | $d_2=2.50$ | 1.50137 | 56.6 |
|  | $r_3=+28.97$ |  |  |  |
|  |  | $l_1=18.36$ |  |  |
|  | $r_4=+49.50$ |  |  |  |
| $L_3$ |  | $d_3=10.0$ | 1.72019 | 50.2 |
|  | $r_5=\infty$ |  |  |  |
| $L_4$ |  | $d_4=21.40$ | 1.59270 | 35.4 |
|  | $r_6=+41.20$ |  |  |  |
|  | $r_7=-490.0$ | $l_2=8.0$ |  |  |
| $L_5$ |  | $d_5=2.50$ | 1.57501 | 41.3 |
|  | $r_8=+37.0$ |  |  |  |
| $L_6$ |  | $d_6=12.10$ | 1.64250 | 58.1 |
|  | $r_9=-45.55$ |  |  |  |

8. A wide-angle objective having substantially the following optical data in relation to a focal length of 100, where L represents the lenses, $r$ the radii, $d$ the axial thicknesses, $l$ the air spaces measured on the axis, $n$ the refractive index of the glass for the $d$-line, and $v$ the Abbé dispersion number, the suffixes denoting the numerical order from the object side:

|  |  |  | $n$ | $v$ |
|---|---|---|---|---|
| $L_1$ | $r_1=+73.81$ | $d_1=9.89$ | 1.71562 | 48.3 |
|  | $r_2=+591.1$ |  |  |  |
| $L_2$ |  | $d_2=2.40$ | 1.50149 | 56.6 |
|  | $r_3=+28.74$ |  |  |  |
|  |  | $l_1=18.16$ |  |  |
|  | $r_4=+48.95$ |  |  |  |
| $L_3$ |  | $d_3=9.04$ | 1.71968 | 50.2 |
|  | $r_5=-395.63$ |  |  |  |
|  |  | $l_2=5.65$ |  |  |
|  | $r_6=-370.97$ |  |  |  |
| $L_4$ |  | $d_4=11.47$ | 1.61653 | 36.6 |
|  | $r_7=+39.26$ |  |  |  |
|  |  | $l_3=7.91$ |  |  |
|  | $r_8=-593.19$ |  |  |  |
| $L_5$ |  | $d_5=2.40$ | 1.57542 | 41.3 |
|  | $r_9=+36.41$ |  |  |  |
| $L_6$ |  | $d_6=17.37$ | 1.64310 | 57.7 |
|  | $r_{10}=-44.39$ |  |  |  |

References Cited in the file of this patent

UNITED STATES PATENTS

| 560,460 | Aldis | May 19, 1896 |
| 1,955,590 | Lee | Apr. 17, 1934 |
| 2,247,068 | Richter | June 24, 1941 |
| 2,341,385 | Kingslake et al. | Feb. 8, 1944 |
| 2,725,789 | Schlegel | Dec. 6, 1955 |

FOREIGN PATENTS

| 724,698 | Great Britain | Feb. 28, 1955 |
| 677,592 | Germany | June 29, 1939 |